United States Patent
Nguyen

(10) Patent No.: US 7,633,853 B2
(45) Date of Patent: Dec. 15, 2009

(54) METHOD FOR DECODING CHANNELISATION CODE SET INFORMATION IN A SPREAD SPECTRUM RECEIVER

(75) Inventor: Phong Nguyen, Victoria (AU)

(73) Assignee: NEC Corporation, Tokyo (JP)

( * ) Notice: Subject to any disclaimer, the term of this patent is extended or adjusted under 35 U.S.C. 154(b) by 194 days.

(21) Appl. No.: 11/570,104

(22) PCT Filed: Jun. 7, 2005

(86) PCT No.: PCT/JP2005/010749

§ 371 (c)(1),
(2), (4) Date: Dec. 6, 2006

(87) PCT Pub. No.: WO2005/122422

PCT Pub. Date: Dec. 22, 2005

(65) Prior Publication Data

US 2007/0177496 A1    Aug. 2, 2007

(30) Foreign Application Priority Data

Jun. 7, 2004    (AU) .............................. 2004903082
May 26, 2005    (AU) .............................. 2005202332

(51) Int. Cl.
    *H04J 11/00*    (2006.01)
(52) U.S. Cl. ....................... 370/209; 370/252; 370/342; 375/147; 455/450
(58) Field of Classification Search .................. 370/209
    See application file for complete search history.

(56) References Cited

U.S. PATENT DOCUMENTS 7,020,180 B2 *    3/2006    Challa et al. ................. 375/147

(Continued)

FOREIGN PATENT DOCUMENTS

BR    204648 A    9/2003

(Continued)

*Primary Examiner*—Chi H. Pham
*Assistant Examiner*—Shick Hom
(74) *Attorney, Agent, or Firm*—Sughrue Mion, PLLC

(57) ABSTRACT

Provided is a method of decoding channelisation code set information to determine the number of channelisation codes and the code offset in a spread spectrum data transmission, where the channelisation code set information includes a first group of bits encoding the number of channelisation codes and a second group of bits encoding the code offset, the method includes deriving the number P of channelisation codes according to $$P = C + \left\lfloor \frac{m-A}{n} \right\rfloor,$$

and deriving the code offset O according to $$O = \left\lfloor \frac{P}{n} \right\rfloor \times (m-2B) + (B+1);$$

where m is the maximum number of multicodes allocated from the spread spectrum data transmission, $$n = \left\lfloor \frac{m}{2} \right\rfloor + 1,$$

A is the value of the first group of bits of the channelization code set information, B is the value of the second group of bits of the channelisation code set information, and $$C = A + \left\lfloor \frac{B}{m-A} \right\rfloor \times (m-2A).$$

5 Claims, 2 Drawing Sheets

U.S. PATENT DOCUMENTS

| | | | | |
|---|---|---|---|---|
| 7,295,850 | B2 * | 11/2007 | Pedersen | 455/515 |
| 2003/0035403 | A1 * | 2/2003 | Choi et al. | 370/342 |
| 2003/0081692 | A1 * | 5/2003 | Kwan et al. | 375/295 |
| 2003/0103491 | A1 * | 6/2003 | Frederiksen et al. | 370/351 |
| 2003/0108025 | A1 * | 6/2003 | Kim et al. | 370/342 |
| 2004/0017843 | A1 * | 1/2004 | Fitton et al. | 375/148 |
| 2005/0037719 | A1 | 2/2005 | Takano | 455/102 |

FOREIGN PATENT DOCUMENTS

| | | |
|---|---|---|
| CA | 2397428 A1 | 2/2003 |
| CA | 2411841 A1 | 5/2003 |
| CN | 1420649 A | 5/2003 |
| CN | 1426247 A | 6/2003 |
| CN | 14356960 A | 8/2003 |
| DE | 10236913 A1 | 3/2003 |
| EP | 1313228 A2 | 5/2003 |
| EP | 1339187 A2 | 8/2003 |
| EP | 1471756 A1 | 10/2004 |
| EP | 1524790 A1 | 4/2005 |
| FI | 20021460 A | 2/2003 |
| FR | 2828606 A1 | 2/2003 |
| GB | 2382275 A | 5/2003 |
| GB | 2382275 B | 5/2003 |
| JP | 2003-143108 A | 5/2003 |
| JP | 3614413 B2 | 5/2003 |
| JP | 2003-198425 A | 7/2003 |
| JP | 2004-297822 A | 1/2005 |
| JP | 2005-006289 A | 1/2005 |
| JP | 2003-565200 A | 5/2005 |
| KR | 446509 B | 2/2003 |
| KR | 3014660 A | 2/2003 |
| KR | 3040139 A | 5/2003 |
| KR | 4073602 A | 8/2004 |
| KR | 4111720 A | 12/2004 |
| KR | 4111721 A | 12/2004 |
| WO | WO 03/065755 A1 | 8/2003 |

\* cited by examiner

METHOD FOR DECODING CHANNELISATION CODE SET INFORMATION IN A SPREAD SPECTRUM RECEIVER

This application claims priority from PCT Application No. PCT/JP2005/010749, filed Jun. 7, 2005, and from Australian Patent Application Nos. 2004903082 and 2005202332, filed Jun. 7, 2004 and May 26, 2005, which applications are incorporated herein by reference.

TECHNICAL FIELD

The present invention relates generally to a method of decoding channelisation code set information in a spread spectrum receiver, and in particular to the decoding of this information to determine the number of channelisation codes and the code offset in a spread spectrum data transmission. The present invention has particular application W-CDMA technology, and it will be convenient to describe the invention in relation to that exemplary, but non-limiting application.

BACKGROUND ART

High Speed Downlink Packet Access (HSDPA) is one of the key features of the third generation wireless communication standard for Wide Band Code Division Multiple Access (W-CDMA). W-CDMA is proposed to support multimedia services in the downlink direction. HSDPA brings high speed data delivery to 3G terminals, ensuring that users requiring effective multimedia capabilities benefit from data rates previously unavailable due to limitations in the radio access network between the user terminal and the base station. HSDPA will provide very high data rates in the downlink direction. In order to achieve these high data rates, several key technologies, such as Adaptive Modulation and Coding (AMC) and Hybrid-ARQ (Automatic Repeat Request) have been considered and adopted in the relevant telecommunication standards. Furthermore, fast signalling techniques have also been used for HSDPA to enhance the AMC link adaptive technique. For HSDPA, the fast signalling technique is applied using the High Speed Shared Control Channels (HS-SCCH) which carries control information for receiving and decoding the associated data channels (HS-DSCH) which is transmitted two slots after the control channel.

In order to ensure the quality of the control information received by a mobile terminal, a high spreading factor channel is used. A spreading factor of 128 is defined for the HS-SCCH. In order to reduce the number of information bits transmitted, certain types of information are encoded with only indicator information being sent to the mobile terminal. This information includes associated HS-PDSCH channelisation codes, transport block size, redundancy version parameter, constellation version parameter, and modulation scheme. This encoded information is sent on a shared control channel which is always two slots in advance of the associated physical data channel (HS-PDSCH). Upon detection of the share control channel intended for it, the mobile terminal proceeds to decode and retrieve control parameters sent on the HS-SCCH to receive and decode the associated HS-PDSCHs which shall arrive in later slots. As part of reducing the number bits transmitted on the HS-SCCH, the channelisation codes used for reception of the associated HS-PDSCHs are encoded so as to be "self-decodable" at the mobile terminal.

For HSDPA, the W-CDMA network needs to signal to the mobile terminal exactly how many channelisation codes have been allocated and at which offset the set of codes begin. In HSDPA, the number of channelisation codes and the code offset of the associated high speed data channel (HS-PDSCH) are encoded to form 7 bits of channelisation code set information $x_{ccs,1}, x_{ccs,2}, x_{ccs,3}, x_{ccs,4}, x_{ccs,5}, x_{ccs,6}, x_{ccs,7}$. The first 3 bits of the channelisation code set information represent the number of channelisation codes, whereas the last 4 bits represent the code offset.

During transmission to the mobile terminal, the number P of channelisation codes and the code offset O are encoded as follows:

$$x_{ccs,1}, x_{ccs,2}, x_{ccs,3} = \min(P-1, 15-P).$$

$$x_{ccs,4}, x_{ccs,5}, x_{css,6}, x_{ccs,7} = |O - 1 - \lfloor P/8 \rfloor * 15|$$

Currently, there is no direct and generic solution to solve the above-referenced equations for P and O from the 7-bit channelisation code set information. A traditional solution to decode P and O from the channelisation code set information is to construct a lookup table which contains all possible combinations of the 7 bits forming the channelisation code set information. However, this solution requires a high level of processing power to search, compare and select a correct value for P and O. Moreover, this solution requires additional memory to store a pre-generated lookup table.

It would be advantageous to provide a method for decoding channelisation code set information to determine the number of channelisation codes and the code set information in a spread spectrum data transmission that ameliorates or overcomes the disadvantages of known channelisation code set information decoding methods.

It would also be desirable to provide a method of decoding channelisation code set information to determine the number of channelisation codes and the code offset in a spread spectrum data transmission that minimised the processing power and/or memory requirements of a mobile terminal in which the decoding was performed.

DISCLOSURE OF INVENTION

One aspect of the invention provides a method of decoding channelisation code set information to determine the number P of channelisation codes and the code offset O in a spread spectrum data transmission, wherein the channelisation code set information includes a first group of bits encoding the number of channelisation codes and a second group of bits encoding the code offset, the method including the steps of: deriving the number P of channelisation codes according to $$P = C + \left\lfloor \frac{m-A}{n} \right\rfloor;$$

and deriving the code offset O according to $$O = \left\lfloor \frac{P}{n} \right\rfloor \times (m - 2B) + (B + 1);$$

where
m is the maximum number of multicodes allocated from the spread spectrum data transmission, $$n = \left\lfloor \frac{m}{2} \right\rfloor + 1,$$

A is the value of the first group of bits of the channelisation code set information, B is the value of the second group of bits of the channelisation code set information, and $$C = A + \left\lfloor \frac{B}{m-A} \right\rfloor \times (m - 2A).$$

In a preferred embodiment of the invention, the maximum number m of multicodes allocated from the spread spectrum data transmission equals 15. In this case, the step of deriving the number P of channelisation codes includes:

determining if B is less than (m−A), and if so deriving the number P of channelisation codes according to P=A+1, or otherwise deriving the number P of channelisation codes according to p=m−A.

Where the maximum number m of multicodes allocated from the spread spectrum data transmission equals 15, the step of deriving the code offset O includes:

determining if P is less than n, and if so deriving the code offset O according to O=B+1, or otherwise deriving the code offset O according to O=m+1−B.

A decoding method including the above-referenced features has the advantage of providing a direct signalling of the number of channelisation codes and the code offset. A method including these steps is on-the-fly self-decodable at the mobile terminal, thereby alleviating the need for lookup tables. Moreover, the signalling is consistent and avoids the use of conditioned signalling, namely signalling only possible code offsets.

Another aspect of the invention provides A despreader for use in spread spectrum receiver comprising processing means for decoding channelisation code set information to determine the number P of channelisation codes and the code offset O in a spread spectrum data transmission, wherein the channelisation code set information includes a first group of bits encoding the number of channelisation codes and a second group of bits encoding the code offset, the method including the steps of:

deriving the number P of channelisation codes according to $$P = C + \left\lfloor \frac{m-A}{n} \right\rfloor;$$

and deriving the code offset O according to $$O = \left\lfloor \frac{P}{n} \right\rfloor \times (m - 2B) + (B + 1);$$

where m is the maximum number of multicodes allocated from the spread spectrum data transmission, $$n = \left\lfloor \frac{m}{2} \right\rfloor + 1,$$

A is the value of the first group of bits of the channelisation code set information, B is the value of the second group of bits of the channelisation code set information, and $$C = A + \left\lfloor \frac{B}{m-A} \right\rfloor \times (m - 2A)$$

BRIEF DESCRIPTION OF DRAWINGS

The following description refers in more detail to the various features of the method of decoding channelisation code set information of the present invention. To facilitate an understanding of the invention, reference is made in the description to the accompanying drawings where the invention is illustrated in a preferred embodiment. It is to be understood that the invention is not however limited to the preferred embodiment illustrated in the drawings.

In the drawings.

BEST MODE FOR CARRYING OUT THE INVENTION

Figure 1:
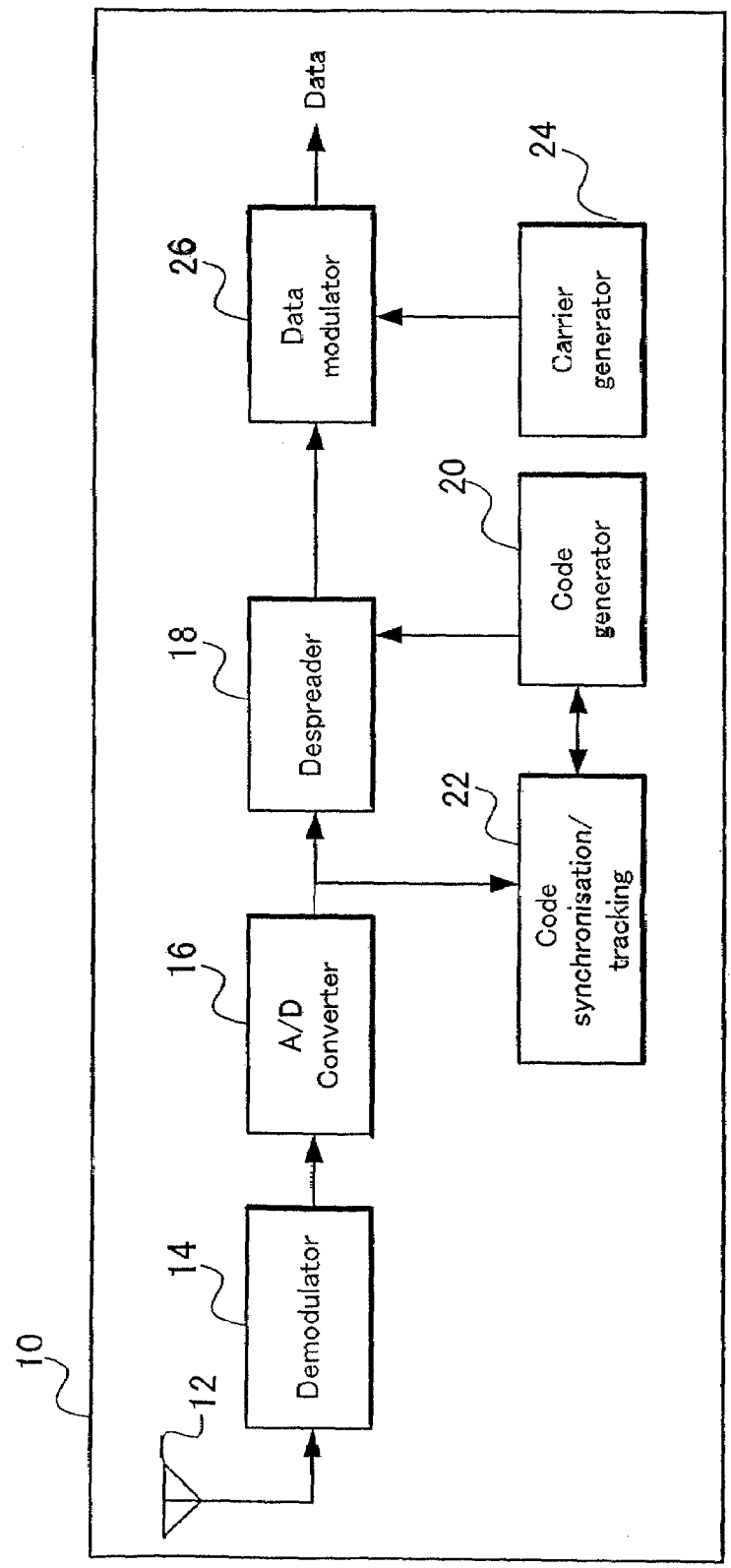
FIG. 1 is a schematic block diagram of a mobile terminal forming part of a telecommunications network.

Referring now to FIG. 1, there is shown generally a mobile terminal 10 in communication with a W-CDMA network. The mobile terminal 10 includes an antenna 12 for receiving spread spectrum data transmissions from a W-CDMA network, a demodulator 14 for demodulating the received signal to a base band frequency, and an analogue to digital converter 16 for digitising the received signal. The mobile terminal 10 also includes a de-spreader 18 to de-spread the digitised spread spectrum signal, using a locally generated code sequence generated by a code generator 20. To be able to perform the de-spreading operation, the de-spreader 18 must not only know the code sequence used to spread the signal, but the codes of the received signal and the locally generated code must all be synchronised. This synchronisation is accomplished at the beginning of the reception of the spread spectrum data transmission and is maintained until the whole signal has been received. A code synchronisation/tracking module 22 performs this operation. After de-spreading, a data modulated signal results, which is demodulated by a data modulator block 26, in conjunction with a carrier generator block 24 in order to recover the original spread spectrum data. The decoding of the channelisation code set information sent on the HS-SCCH to the mobile terminal is carried out by the de-spreader 18.

Figure 2:
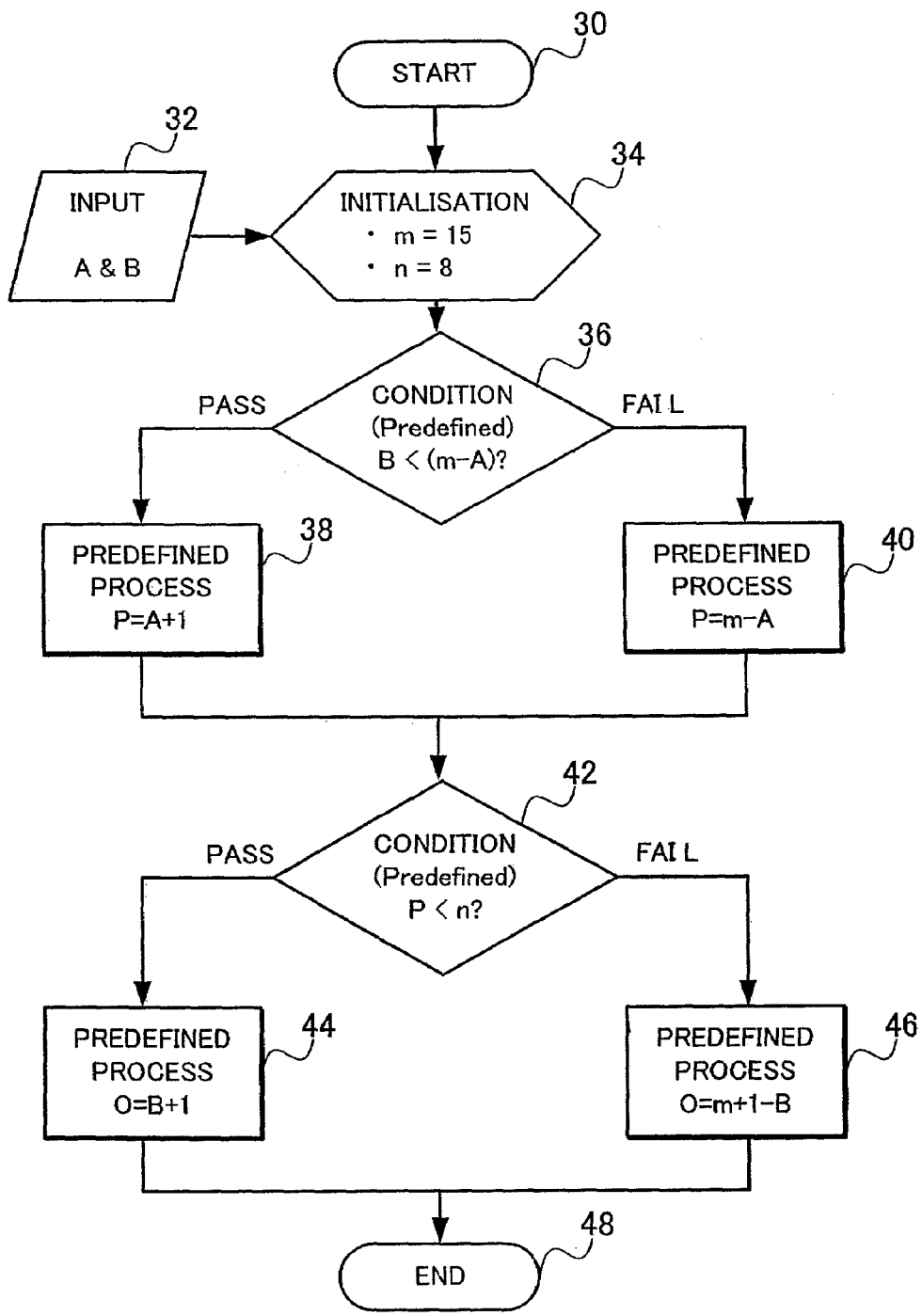
FIG. 2 is a flow chart illustrating a method of decoding channelisation code set information performed by the mobile terminal of FIG. 1.

FIG. 2 is a flow chart showing the steps carried out by the de-spreader 18 during the decoding of the channelisation code set information. The channelisation code set information includes a first group of bits encoding the number P of channelisation codes and a second group of bits encoding the code offset O. In HSDPA, the number P of channelisation codes is encoded in 3 bits, whereas the code offset O is encoded in 4 bits. The applicant has determined that the number of channelisation codes and the code offset can be decoded as follows. Firstly, the number P of channelisation codes can be decoded according to the following formula:

$$P = C + \left\lfloor \frac{m-A}{n} \right\rfloor$$

$$\text{where } C = A + \left\lfloor \frac{B}{m-A} \right\rfloor \times (m - 2A)$$

where m and n are control parameters for adjusting to any change in maximum number of multicodes, namely m is the maximum number of HS-PDSCH multicodes for one cell, and $$n = \left\lfloor \frac{m}{2} \right\rfloor + 1,$$

and where

A is the value of the first 3 bits of 7-bit channelisation code set and B is the value of the last 4 bits of 7-bit channelisation code set.

Similarly, the code offset O can be obtained by the following formula:

$$O = \left\lfloor \frac{P}{n} \right\rfloor \times (m - 2B) + (B + 1)$$

By applying the above formulae for HSDPA with a maximum number of channelisation codes equal to 15 and a spreading factor of 16, the number P of channelisation codes and the code offset O can be obtained by applying the steps illustrated in the flow chart shown in FIG. 2. The de-spreader 18 of FIG. 1 acts to perform these steps shown in FIG. 2. Advantageously, the de-spreader 18 is realised by using digital signal processing techniques in order to optimising the processing efficiency and minimise the power consumption of the user terminal.

As seen in FIG. 2, after the start of the decoding method at step 30, the values of A and B are input at step 32, namely the value of the first 3 bits of the 7 bit channelisation code received on the HS-SCCH, and the value of the last 4 bits of the 7 bit channelisation code set information. At step 34, the maximum number of m of multicodes allocated to the spread spectrum data transmission is initialised to equal 15, whereas the value n is initialised to equal 8. At step 36, a determination is made as to whether B is less than (m−A) and if so, the number P of channelisation code is derived according to P=A+1 at step 38. If the condition determined in step 36 is not met, then the number P of channelisation codes is derived according to P=m−A at step 40. Accordingly, the value of P is derived either in steps 38 or 40.

At step 42, a determination is made as to whether P is less than n. If this condition is met, then the code offset O is derived according to O=B+1 at step 44.

If the condition in step 42 is not met, then the code offset O is derived according to O=m+1−B at step 46. Accordingly, the value of the code offset O is determined at either steps 44 or 46. The channelisation code set information decoding method is terminated at step 48.

The present invention may be implemented using hardware, software or any combination thereof. In an embodiment when the invention is implemented using software, a series of instructions to enable the elements of the mobile terminal 10 to perform the series of steps described in relation to FIG. 2 may be stored in a non volatile memory or other data storage device. The series of instructions may act to cause a data processing unit to perform the functions of the invention as described herein.

In another embodiment, the invention is implemented primarily in hardware using, for example, hardware components such as Application Specific Integrated Circuits (ASIC). The ASIC may be adapted to perform digital signal processing techniques. Implementation of the hardware state machine so as to perform the functions described herein will be apparent to persons skilled in the relevant art.

In yet another embodiment, the invention is implemented using a combination of both hardware and software. The nature of the processing means chosen to implement the functionality of the invention as described herein may therefore depend upon the particular embodiment of the invention. The choice of the relevant processing means for each embodiment will be apparent to a person skilled in the relevant art.

Finally, it is to be understood that various modifications and/or additions may be made to the above described decoding method without departing from the spirit or ambit of the present invention.

The invention claimed is:

1. A method of decoding channelisation code set information by a spread spectrum receiver to determine the number P of channelisation codes and the code offset O in a received spread spectrum data transmission, wherein the channelisation code set information includes a first group of bits encoding the number of channelisation codes and a second group of bits encoding the code offset, the method comprising:

wherein the maximum number m of multicodes allocated from the spread spectrum data transmission equals 15, and wherein a step of deriving, by the spread spectrum receiver, the number P of channelisation codes in the received spread spectrum data transmission comprises:

determining if B is less than (m−A), and if so deriving the number P of channelisation codes according to P=A+1, or otherwise deriving the number P of channelisation codes according to P=m−A, where $$n = \left\lfloor \frac{m}{2} \right\rfloor + 1,$$

A is the value of the first group of bits of the channelisation code set information, and B is the value of the second group of bits of the channelisation code set information.

2. The method according to claim 1, further comprising:

a step of deriving, by the spread spectrum receiver, the code offset O in the received spread spectrum data transmission, the step comprising:

determining if P is less than n, and if so deriving the code offset O according to O=B+1, or otherwise deriving the code offset O according to O=m+1−B.

3. A despreader for use in spread spectrum receiver comprising:
  processing means for decoding channelisation code set information to determine a number P of channelisation codes and a code offset O in a spread spectrum data transmission,
  wherein the channelisation code set information includes a first group of bits encoding the number of channelisation codes and a second group of bits encoding the code offset, and wherein said despreader:
  wherein the maximum number m of multicodes allocated from the spread spectrum data transmission equals 15, and wherein a step of deriving the number P of channelisation codes comprises:
  determining if B is less than (m−A), and if so deriving the number P of channelisation codes according to P=A+1, or otherwise
  deriving the number P of channelisation codes according to P=m−A,
  where $$n = \left\lfloor \frac{m}{2} \right\rfloor + 1,$$

A is the value of the first group of bits of the channelisation code set information,
  B is the value of the second group of bits of the channelisation code set information.

4. A tangible computer readable medium having embodied thereon a computer program for executing a method of decoding channelisation code set information by a spread spectrum receiver to determine the number P of channelisation codes and the code offset O in a received spread spectrum data transmission, wherein the channelisation code set information includes a first group of bits encoding the number of channelisation codes and a second group of bits encoding the code offset, the method comprising:
  wherein the maximum number m of multicodes allocated from the spread spectrum data transmission equals 15, and wherein a step of deriving, by the spread spectrum receiver, the number P of channelisation codes in the received spread spectrum data transmission includes:
  determining if B is less than (m−A), and if so deriving the number P of channelisation codes according to P=A+1, or otherwise
  deriving the number P of channelisation codes according to P=m−A.
  where $$n = \left\lfloor \frac{m}{2} \right\rfloor + 1,$$

A is the value of the first group of bits of the channelisation code set information, and
  B is the value of the second group of bits of the channelisation code set information.

5. The method according to claim 4, further comprising:
  a step of deriving, by the spread spectrum receiver, the code offset O in the received spread spectrum data transmission, the step comprising:
  determining if P is less than n, and if so deriving the code offset O according to O=B+1, or otherwise
  deriving the code offset O according to O=m+1−B.

* * * * *